Figure 18:
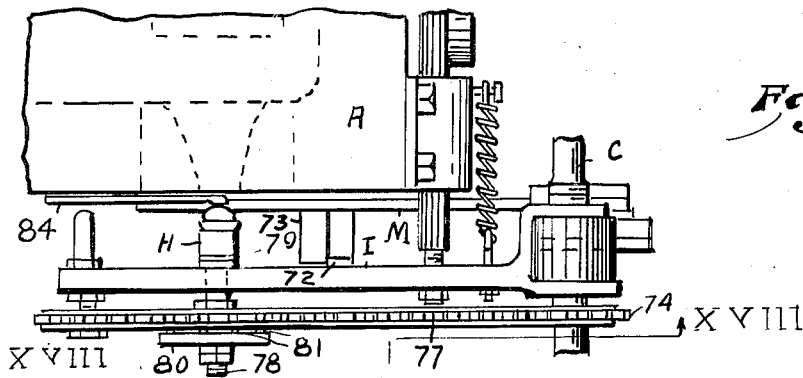

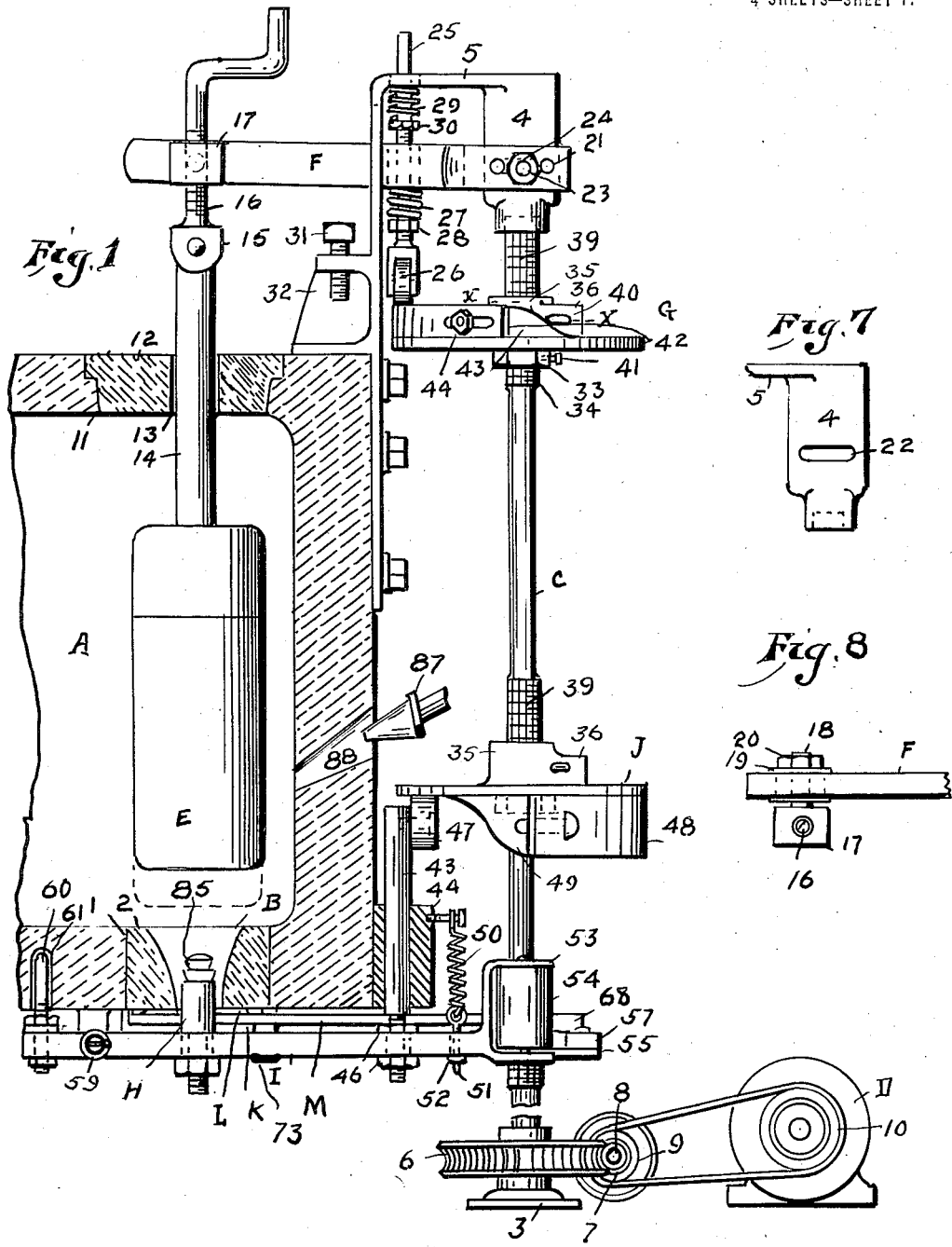

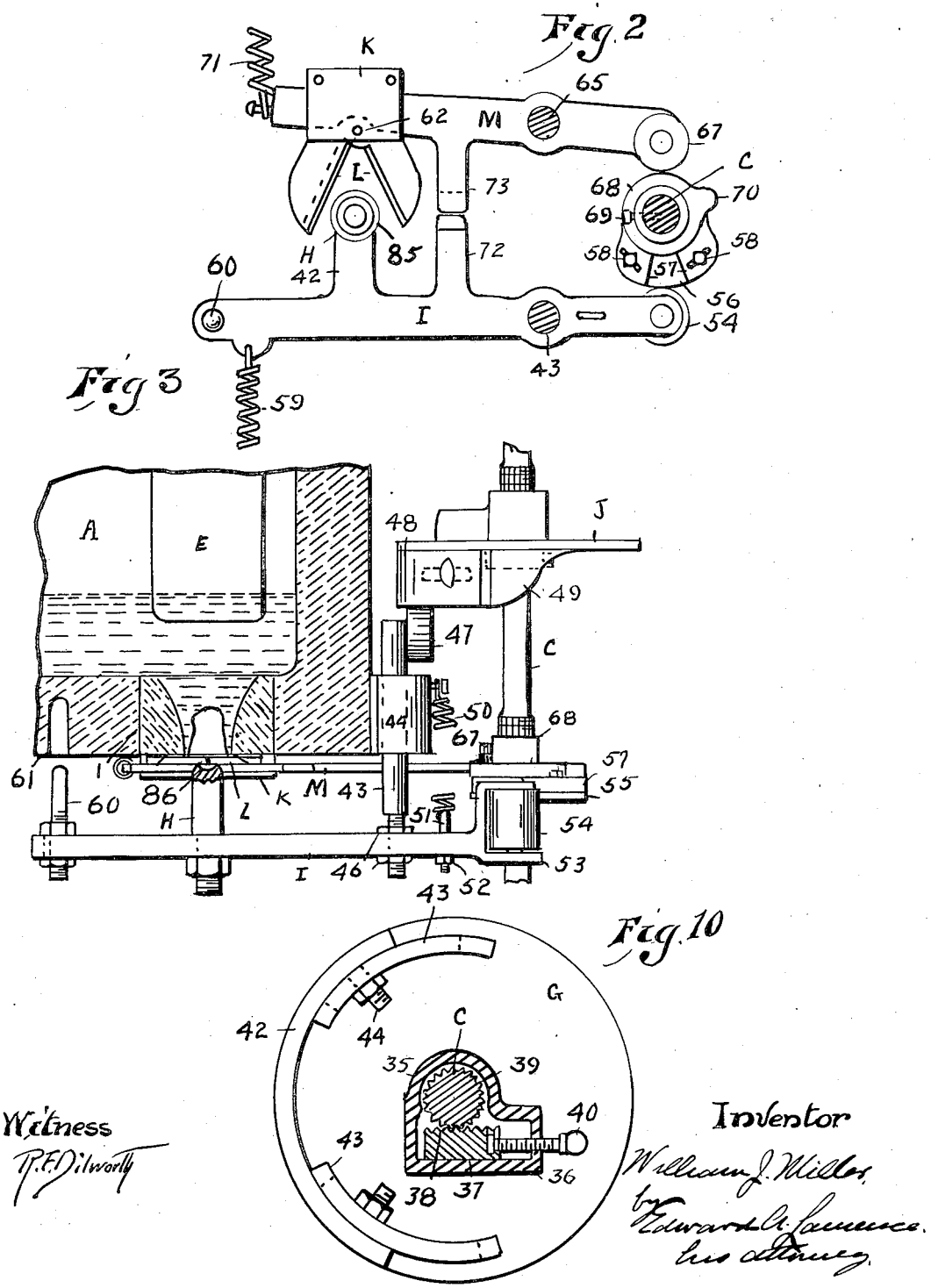

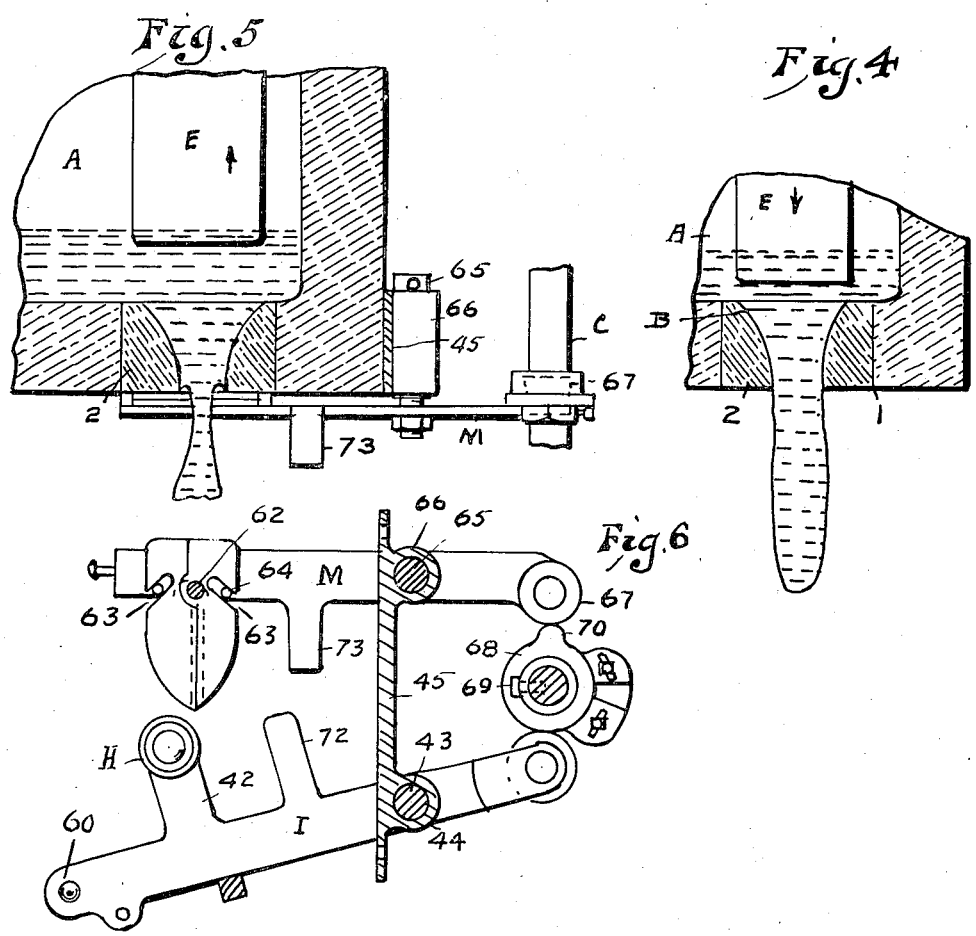
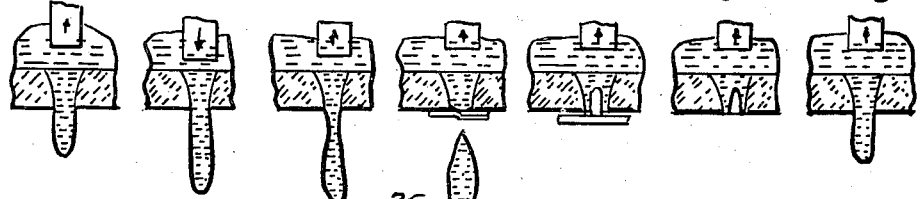
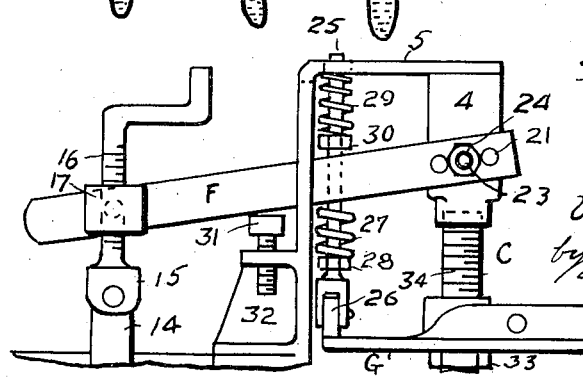

W. J. MILLER.
PROCESS AND APPARATUS FOR FEEDING GLASS.
APPLICATION FILED DEC. 6, 1920.

1,413,757.

Patented Apr. 25, 1922.
4 SHEETS—SHEET 4.

Witness
R. F. Dilworth

Inventor
William J. Miller
by Edward A. Lawrence
his attorney

UNITED STATES PATENT OFFICE.

WILLIAM J. MILLER, OF SWISSVALE BOROUGH, PENNSYLVANIA.

PROCESS AND APPARATUS FOR FEEDING GLASS.

1,413,757.                   Specification of Letters Patent.   Patented Apr. 25, 1922.

Application filed December 6, 1920. Serial No. 428,753.

*To all whom it may concern:*

Be it known that I, WILLIAM J. MILLER, citizen of the United States, and residing in the borough of Swissvale, in the county of Allegheny and State of Pennsylvania, have invented or discovered new, useful, and Improved Processes and Apparatus for Feeding Glass, of which the following is a specification.

My invention consists in a new and improved process and apparatus for feeding glass.

The object which I have in view is the feeding of molten glass from a tank or other container in proper condition, at proper intervals and in proper quantities to form gathers for glass fabricating mechanism.

Generally speaking my apparatus presents the following characteristic features.

The tank or other container is provided with a discharge port for the outward flow of molten glass. Associated with said port is shearing mechanism, which at proper intervals severs the glass protruding from the port to form gathers.

I provide a pushback or stopper mechanism which acts between shearing operations to temporarily interrupt the flow of glass through said port. Said pushback is arranged to enter the outer end of the discharge port after a shearing operation, thus forcing the chilled neck of glass inwardly toward the zone of remelting heat, and the impingement of the pushback against the glass chilling the surface of the same thereby forming a temporary dam or obstruction of hardened glass. This wall of chilled glass, the pushback having been in the meanwhile removed, holds back the molten glass until melted by the heat when it breaks down permitting the hot glass, to flow down through to form the next gather.

The contact end of the pushback is preferably rounded or tapered so as to impart an inwardly arched or curved conformation to the wall of chilled glass, which is best suited to produce the temporary damming effect desired.

I prefer to impart a rotary movement to the pushback as it is inserted into the discharge port and while it dwells or remains in contact with the glass to prevent it from adhering thereto, and to facilitate the retrograde movement of the glass. The pushback should not be overheated so as to stick to the glass nor at such a low temperature as to excessively chill the glass and thus unduly delay the resumption of the flow. Thus I may provide means, when necessary, to either cool or heat the pushback where required.

I may advantageously arrange the pushback to carry a quantity of suitable liquid, such as water, which, as the pushback is inserted into the discharge port, will gasify, forming a layer of vapor or gas between the end of the pushback and the glass which will act as a cushion to prevent undue chilling of the latter. The liquid may be carried in the porous surface of the pushback, in cavities or depressions in its surface, or it may be otherwise supplied thereto.

To insure the proper movement of glass in and through the discharge port and its proper protrusion to form the desired gathers, and also the proper attenuation of the necks of the gathers to facilitate shearing, I prefer to provide a plunger mechanism, which cooperate with said discharge port.

Adjustments are provided for properly synchronizing the operations of the various associated mechanisms and structural elements, to insure the various characters of gathers required for different fabricating operations, and to accommodate the feeder to the varying viscosities and conditions of the molten glass.

Other novel features of construction and arrangements of parts will appear from the following description.

Figure 19:
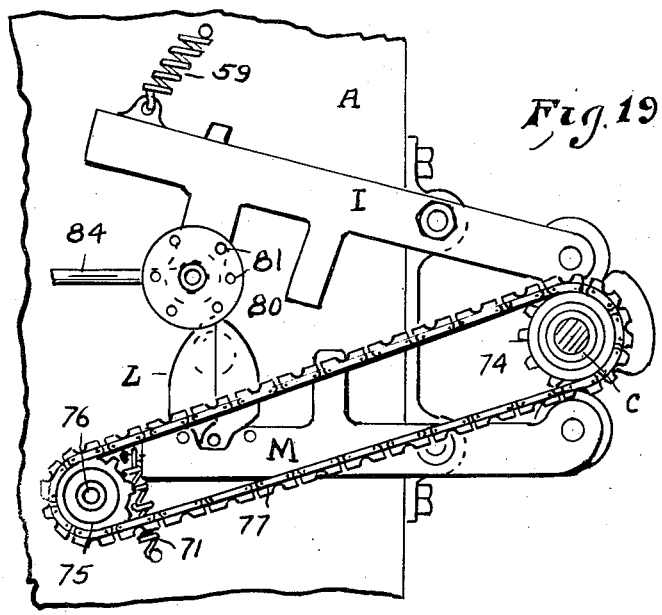
Figure 20:
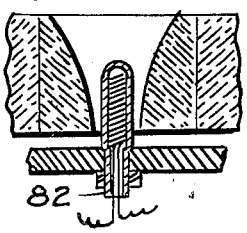
Figure 21:
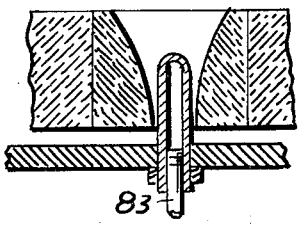
Figure 22:
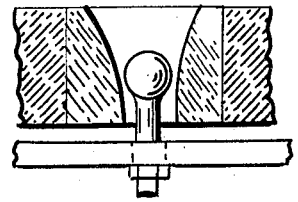
Figure 23:
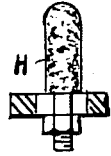

In the accompanying drawings, which are however merely intended to illustrate a practical embodiment of the principles of my invention without limiting the scope of the latter to the construction shown, Fig. 1 is an elevation of a glass feeder embodying the principles of my invention, the boot of the glass tank being shown in vertical section and the pushback inserted into the discharge orifice; Fig. 2 is a top plan view of the pushback and shearing mechanism in the relative positions indicated in Fig. 1, and the boot of the furnace being omitted to show parts; Fig. 3 is a broken view similar to Fig. 1 but showing the pushback depressed out of the discharge port preparatory to being swung out of the way to permit the glass to flow down through the discharge port; Fig. 4 is an incomplete view similar to Fig. 1 showing the plunger depressed to elongate the depending gather of protruding glass; Fig. 5 is a similar view showing the shearing operation, the lower end of the depending gather being broken away on account of lack of space in the drawings; Fig. 6 is a view similar to Fig. 2 but showing the mechanism in the shearing operation, and also showing the front plate of the boot in horizontal section; Fig. 7 is a detail of the cap bearing block of the operating shaft with the walking beam removed; Fig. 8 is a detail in plan showing the free or inner end of the walking beam and the pivot nut; Fig. 9 is a broken elevation showing the walking beam depressed; Fig. 10 is a sectional view taken along the line X—X in Fig. 1 and showing the plunger operating cam plate; Figs. 11 to 17, inclusive, are diagrammatic views showing the formation and shearing of the gather and the retraction of the glass in the discharge port; Fig. 18, is a view similar to Fig. 1, but showing means for giving a rotary movement to the pushback while entering and dwelling in the discharge port; Fig. 19 is an inverted plan view of the same, partly in section along the line XIX—XIX in Fig. 18; Figs. 20, 21 and 22 are details showing various forms of pushbacks, and Fig. 23 is a detail showing the application of a liquid, such as water, to the pushback before its insertion into the discharge port.

The following is a detailed description of the drawings, reference being first had to Figs. 1 to 10 inclusive.

A represents the boot or shallow extension of a tank or other container for molten glass, provided with an opening 1 in which is mounted the bushing 2, of refractory material, and provided with an axial bore, preferably outwardly or downwardly tapered which form the discharge port B of the feeder.

C is a driven or operating shaft vertically disposed adjacent to the boot. Thus in Fig. 1 I have shown the lower end of the shaft C mounted in a step bearing 3 secured to the floor or other convenient foundation or support, while its upper end is journaled in a cap bearing block 4 mounted on an angular bracket 5 secured to the boot A. Rotary power is applied to the shaft C in any convenient manner. Thus 6 is a worm gear mounted on said shaft and in mesh with a worm 7 on a horizontally journaled shaft 8 whose pulley 9 is belted to the pulley 10 and the shaft of a variable speed motor D.

E is the plunger working within the boot A in alinement with the port B. Said plunger is of refractory material or is provided with a refractory outer surface, and in the drawings, wherein the discharge port is in the bottom of the boot, the plunger is shown as disposed and reciprocating in a vertical plane. The roof of the boot A is provided with a differential opening 11 for the insertion and removal of the plunger, normally closed by the block 12 provided with an axial opening 13 for the metal stem 14 by means of which the plunger is suspended and reciprocated. The upper end of the stem 14 is connected, as by means of the clevis 15 with the lower end of a screw shaft 16 screwed through the nut 17. The nut 17 is provided with a laterally extending stem 18 which is journaled in a horizontal hole through the inner end of the walking beam F. A washer 19 and nut 20 are provided for the free end of the said stem 18. Thus the plunger is pivotally supported from the walking beam. The upper end of the shaft 16 is bent to form a crank handle, so that the plunger may be raised or lowered in relation to the walking beam by turning the shaft 16 in the nut 17.

The walking beam extends through a vertically disposed slot in the bracket 5 and has its outer end forked to extend on either side of the bearing block 4. Said forks are provided with a plurality of pairs of alined pin holes 21; and the block 4 is provided with a horizontally slotted opening 22. 23 is a wrist pin inserted through said slot 22 and through one of said pairs of holes 21, and 24 represents washers and nuts on the threaded ends of said pin 23. Thus the walking beam F is pivoted to the block 4 and the pivot point may be adjusted by shifting the pin 23 from one set of holes 21 to another, thus enabling the throw of the free end of the walking beam to be varied by shifting the fulcrum point.

25 is a rod extending through a vertically disposed slotted hole in the walking beam F with its upper end guided in a hole in the horizontal portion of the bracket 5. The lower end of said rod is bifurcated, and 26 is a roller journaled therein and engaging the cam plate G. 27 is a helical spring coiled about the rod 25 below the walking beam and supported from below by a nut 28 screwed on the rod 25 which is threaded. Thus the spring 27 may be raised and lowered on the rod by adjusting the nut 28. 29 is a second helical spring coiled about the rod 25 between the lower side of the bracket 5 and a nut 30 screwed on the rod 25 above the walking beam. The spring 29 is of less strength than the spring 27.

I provide an adjustable stop device to limit the descent of the plunger, in the form of an abutment bolt 31 screwed into a threaded hole in a projection 32 of the bracket 5.

G is a circular cam plate supported on the shaft C by a nut 33 engaging threads 34 on said shaft. The hub 35 of said plate is provided with a tangentally disposed seat 36 in which is slidably mounted a block 37 provided on its inner face with rack teeth 38 which engage the vertical teeth 39 cut in annular series in the shaft C. 40 is a screw bolt whose inner end is swivelled in the end of block 37 and which extends through and is screwed in a threaded hole in the end of the seat 36. Thus, by turning the bolt 40, the block 37 will be shifted in relation to the shaft C and the plate G may thus be adjusted by turning it on the shaft C. Thus both the elevation and the rotary position of the plate G can be accurately adjusted on the shaft C.

The nut 33 may be locked in its position on the shaft C by any convenient means such as the set screw 41.

The plate G is provided with a fixed rim track 42 extending partially around its edge, and 43 represents track extension plates curved to fit the inner face of the track 42, and adapted to be slid out or in to vary the length and end positions of said track. Said extension plates are clampable in their adjusted position by means of bolts 44 engaging slots in the track 42 and bolt holes in the extension plates 43. The outer ends of the extension plates 43 are bevelled down to the level of the plate G to enable the roller 26 to ride up onto and down from the elevated track to the surface of the plate G, without jarring.

It is evident that the roller 26 and rod 25 will be alternately elevated and lowered by the rotation of the shaft C and the plate G, and that the zone of reciprocation of said rod may be nicely regulated by the described adjustments provided for the plate G and the track 42.

As the rod 25 rises, the spring 27 will pick up the walking beam F, the compression of the spring providing the necessary force to start the plunger upwardly in the tenacious molten glass. Thus by adjusting the nut 28 the power of the spring 27 may be regulated to obtain the desired speed of elevation.

The elevation of the rod 25 compresses the spring 27, thus storing power for the next downward movement of the plunger. As the roller 26 passes off the elevated track of the cam plate G to the flat surface of the latter, the rod 25 descends, relieving the pressure of the spring 27 against the under side of the walking beam and the spring 29 expands forcing the walking beam downwardly and causing the plunger to be lowered toward the port B until the walking beam strikes the adjustable stop 31. Thus the stored energy in the spring 29 determine the force and speed of the downward movement of the plunger.

It is thus evident that a very close timing and adjustment in plunger movement may be obtained.

H is the pushback mounted on the lateral extension 42 of a lever I pivotally mounted near its outer end to swing in a horizontal plane. Thus 43 is a vertically disposed rod slidably mounted in a bearing block 44 secured to the front plate 45 of the boot A. The lower end of said rod is reduced and threaded to extend through a pivot hole in the lever I and to receive the upper and lower nuts 46 to secure the lever to the rod. The upper end of said rod is provided with a roller 47 journaled on a horizontal axis and engaging from below a cam plate J mounted on the shaft C. The mounting of the plate J is similar to that of the plate G, so that the position of said plate on said shaft may be adjusted both in a vertical and in a horizontal plane.

The plate J is provided on its lower surface with a partially circumferential cam track 48 similar to the track 42 of the plate G, and likewise extensible by means of extension plates 49, similar to the extension plates 43 of the cam plate G.

50 is a helical spring whose upper end is secured to a headed pin on the block 44 while its lower end is attached to the looped head of a bolt 51 which extends through a hole in lever I and is threaded to receive a nut 52 screwed up against the lower surface of the lever I, thus regulating the tension of the spring 50.

Thus the roller 47 is held resiliently in contact with the cam plate J. It is evident that the rotation of the shaft C will cause the lever I to be raised and lowered without tipping.

The front end of the lever I is provided with a yoke 53 to receive the wide roller 54 journaled on a vertical axis. 55 is a cam collar mounted on the shaft C and preferably adjustable thereon both vertically and horizontally by means similar to those more particularly described in connection with the cam plate G. Said collar 55 is provided with a permanent or fixed cam projection 56 which may be extended at either end by means of extension plates 57 which may be clamped in any adjusted position by means of bolts 58. The roller 54 is resiliently held in contact with the collar 55 by means of a helical spring 59 connecting the inner end of the lever I with a fixed point, such as a post depending from the bottom of the boot, not shown. Thus it is evident that in addition to the vertical movement, the lever I is also swung by the rotation of the shaft C in a horizontal plane, and such horizontal movement may be accurately regulated by adjusting the position, and cam projections, of the collar 55.

60 is a dowel pin mounted on the inner end of the lever I and adapted to be seated up in a socket 61 on the under side of the boot A to properly guide the pushback H up into the port B as the lever I is raised.

K represents a box secured to the underside of the boot A having its front, toward the port B, and its sides open. L represents a pair of coacting shear blades pivoted together and to the top and bottom of the box K as by the bolt 62. 63 represents slots in the blades L engaged by pins 64 on the lever M whose inner end oscillates in the box K, and which is pivotally mounted, to swing in a horizontal plane, on the lower end of a rod 65 depending from a block 66 secured to the front plate 45. The outer end of the lever M is provided with the roller 67 journaled on its vertical axis and in contact with a collar 68 on the shaft C above the collar 55.

The collar 68 is held in its proper position on the shaft C by any convenient means, such as a set screw 69. Said collar is provided with a radial cam projection 70. 71 is a helical spring connecting the inner end of the lever M with a fixed point, not shown, such as a post depending from the bottom of the boot. The parts of the shear mechanism are assembled, so that while the roller 67 is in contact with the uncammed perimeter of the collar 68, the shears are open, as shown in Fig. 2, but said shears are quickly closed, as shown in Fig. 6 as the roller engages the cam projection 70, and are opened by the spring 71 when the roller passes beyond said projection. If desired means, similar to those provided for cam plate G, may be provided for the accurate positioning of the collar 68 in relation to the shaft C and for regulating the effective length and position of the projection 70 on said collar, but I prefer to use the simple cam collar described, and thus make the shear mechanism the basis for the adjustment and synchronization of the other mechanisms.

The levers I and M are provided with opposed abutments 72 and 73, respectively so that when the lever M swings into its shear closing position, the lever I will be kicked aside should the spring 59 not have already swung the pushback out of the way, and vice versa, the swing of the lever I into position to insert the pushback up into the discharge port will result in throwing the shears open should the spring fail in its function.

I prefer to provide means for rotating the pushback as it is inserted up into and dwells in the discharge port B. Thus in Figs. 18 and 19 I show a sprocket wheel 74 fixed on the shaft C and a second and preferably smaller sprocket 75 journaled on a post 76 depending from the boot A. 77 is a sprocket chain, with notched links, engaging said sprocket and extending below and on the opposite side of the discharge port B from the shear box. The pushback H is in this case mounted on the upper end of a short shaft 78 journaled intermediate of its ends in a vertical bearing in the lever I, nuts and washers 79 being provided on said shaft above and below said lever to prevent longitudinal movement of said shaft relative to the lever I. The lower end of said shaft is provided with a wheel 80 provided with pins 81 which will engage the notches of chain 77 as the pushback is inserted up into the port B.

The rotation of the pushback assists in its insertion into the discharge port and in the forcing back of the glass therein to form the arched wall of chilled glass, and also eliminates all danger of the glass adhering to the pushback.

Generally speaking the operation of my improved feeder is as follows.

The molten glass flows out through the port B and very quickly develops a tendency, owing to its weight, to thin near the orifice. The plunger therefore starts down, thus forcing out the glass and maintaining the proper thickness of the gather now forming. The plunger then stops its descent, thus causing the depending gather to thin at the neck. The plunger then starts to ascend, thus drawing the glass upwardly in the port B, further attenuating the neck of the gather to facilitate the shearing. The shears then close, severing the gather which drops. The shears promptly open to give clearance for the pushback which is swung under the discharge port as the shears open. The pushback is then elevated and inserted into the discharge port, forcing back the glass and dwelling for a sufficient period to form the chilled wall. The pushback is preferably inserted before the plunger completes its upward movement. The pushback is then dropped and swung aside, and as the glass wall melts, the hot glass breaks through the center of the same and again flows down through the port to form the next gather, the apex or lower end of the gather being highly heated, thus being fitted to form the neck of the bottle or other ware.

Thus in Fig. 11 I show the glass starting to flow out of the discharge port. In Fig. 12, the plunger is descending to maintain the proper thickness in the protruding flow of glass. In Fig. 13 the plunger is ascending, assisting gravity in attenuating the neck of the depending gather. In Fig. 14, the shears have closed severing the neck and allowing the gather to drop. In Fig. 15 the pushback is shown inserted in the discharge port, forcing back the glass. In Fig. 16, the glass is shown held back in the port by the arch of chilled glass, and in Fig. 17, as in Fig. 11 the glass is shown as having broken through the melted wall and flowing down out of the discharge port.

The spring 50, which lifts the pushback for its insertion into the port B, automatically adjusts the degrees of insertion of the push-back to suit the fluidity of the glass. Thus, if the glass flowing in the port be relatively stiff, it is not necessary to retract the same to as great degree in the port, to interrupt its flow, as where the glass is thinner, or more fluid. The stiffer glass, of course, resists to a greater degree the insertion of the pushback, thus resisting the energy of the spring which thereby takes up this resistance by its resiliency, and does not positively force the pushback into the port as would unresilient means for inserting the pushback. The pushback is thus automatically inserted to the degree required in accordance with the degree of fluidity of the glass in the port. The spring 50 is made adjustable to properly respond to the varying viscosities of the glass.

Again where the glass in the boot is relatively stiff, it does not require to be drawn back by the ascending plunger, to thin the neck of the gather, to as great a degree as does thinner or more fluid glass. Also the greater stiffness of the glass resists the upward movement of the plunger. This results in resisting the upward thrust of spring 27, compressing said spring and resulting in an upward movement of the plunger reduced by the compression of the spring. Thus the upward movement of the plunger is automatically accommodated to suit the fluidity of the glass. On the other hand thicker glass flows more slowly through the discharge port and must therefore be given more time to flow. Therefore I take advantage of the greater resistance of the thicker glass to the descent of the plunger which thus causes the spring 29 to be compressed to a greater degree thus causing the plunger to lag in its descent to the necessary degree to regulate the flow of glass out through the port. The spring 27 is made adjustable so as to properly respond to the varying viscosities of the glass.

In Fig. 20 I show the pushback provided with an electric heater 82 to prevent its becoming so cool as to excessively chill the glass. In Fig. 21 I have shown the pushback cooled by a water connection 83 to prevent its becoming so hot as to cause the glass to adhere to it. In Fig. 22 I have shown the pushback provided with a ball head and restricted stem. In Fig. 23 I have shown a drip pipe 84 by means of which water or some other suitable fluid may be supplied to the pushback while the latter is in its inoperative position. Thus in Fig. 1, I have shown the pushback provided with annular grooves 85 to retain the fluid. In Fig. 3 I have shown the pushback provided with a dimple or depression 86 on its nose. In Fig. 23 I have shown the pushback with a graphite surface porous to carry the fluid. The fluid is gasified by the heat as the pushback is inserted into the discharge port, thus forming a cushion of gas or vapor between the glass and the end of the pushback which prevents overchilling of the glass.

I prefer to provide a gas heater 87 extending through a port 88 in the front of the boot to keep the plunger E and the molten glass in the boot at the proper temperature.

I may omit the plunger mechanism and rely on the pushback alone for controlling the feeding of the glass through the discharge port, but owing to the different characters of gathers required and the varying fluidity of the glass, I prefer to use the plunger mechanism in combination with a pushback and shears.

It is evident that the push back, as it is inserted into the discharge port, forces the chilled and scarred neck, formed by the shears, back into the zone of remelting heat so that such hardened end is eliminated before the outward flow of glass is resumed after the withdrawal of the push back.

Although, for the sake of clearness, I have minutely described the embodiment of the principles of my invention shown in the drawings, I do not wish to limit myself thereby, but claim broadly:—

1. In glass feeding, the process of controlling the flow of glass through the discharge port of a container between intermittent shearing operations, which consists in damming back the sheared neck in said port with a wall of chilled glass until said wall is melted down and the flow is resumed.

2. In glass feeding, the process of controlling the flow of glass through the discharge port of a container between intermittent shearing operations, which consists in retracting the sheared neck in said port and forming a wall of chilled glass which holds the molten glass retracted until said wall is melted down and the flow of glass resumed.

3. In glass feeding, the process of controlling the flow of glass through the discharge port of a container between intermittent shearing operations, which consists in retracting the sheared neck in said port and forming an arched wall of chilled glass which holds the molten glass retracted until said wall is melted down and the flow of hot glass is resumed through said wall.

4. In glass feeding, the process of controlling the flow of glass through the discharge port of a container between intermittent shearing operations, which consists in retracting the sheared neck in said port and forming a wall of chilled glass which holds the molten glass retracted until said wall is melted down and the flow of glass resumed, the retraction of said glass being automatically varied to suit the viscosity of the glass, substantially as described.

5. In glass feeding, the process of controlling the flow of glass through the discharge port of a container between intermittent shearing operations, wherein the neck is severed at the outer end of the discharge port, which consists in inserting a pushback into the outer end of the port to force the sheared neck back into the port and temporarily interrupt the flow.

6. In glass feeding, the process of controlling the flow of glass through the discharge port of a container between intermittent shearing operations, wherein the neck is severed at the outer end of the discharge port, which consists in inserting a pushback into the outer end of the port to force the sheared neck back into the port and temporarily interrupt the flow, the degree of such insertion being regulated to suit the varying viscosity of the glass.

7. In glass feeding, the process of controlling the flow of glass through the discharge port of a container between intermittent shearing operations, which consists in inserting a pushback into the outer end of the port to force the sheared neck back into the discharge port and to form a wall of glass which temporarily holds back the flow of hot glass.

8. In glass feeding, the process of controlling the flow of glass through the discharge port of a container between intermittent shearing operations, which consists in inserting a pushback into the outer end of the port to force the sheared neck back into the discharge port and to form a wall of glass which temporarily holds back the flow of hot glass, the degree of such insertion being regulated to suit the varying viscosity of the glass.

9. In a glass feeder, for use in connection with a container for molten glass provided with a discharge port, the combination of shearing mechanism intermittently operated to sever at the mouth of said port the glass protruding from said port to form gathers, and mechanical means adapted to be inserted into said port between shearing operation to force the sheared neck back into the discharge port and to temporarily interrupt the outward flow of glass.

10. In a glass feeder, for use in connection with a container for molten glass provided with a discharge port, the combination of shearing mechanism intermittently operated to sever the glass protruding from said port to form gathers, and a pushback adapted to be inserted into said port after each shearing operation to force back the sheared neck and temporarily interrupt the outward flow of glass.

11. In a glass feeder, for use in connection with a container for molten glass provided with a discharge port, the combination of shearing mechanism intermittently operated to sever the glass protruding from said port to form gathers, mechanical means adapted to be inserted into said port between shearing operations to temporarily interrupt the outward flow of glass, and means for interposing a gaseous cushion between said means when the latter is inserted into said port and the surface of the glass, for the purposes described.

12. In a glass feeder, for use in connection with a container for molten glass provided with a discharge port, the combination of shearing mechanism intermittently operated to sever the glass protruding from said port to form gathers, a pushback adapted to be inserted into said port after each shearing operation to force back the sheared neck and temporarily interrupt the flow of glass, and means for interposing a gaseous cushion between said pushback and the surface of the glass, for the purposes described.

13. In a glass feeder, for use in connection with a container for molten glass provided with a discharge port, the combination of shearing mechanism intermittently operated to sever at the mouth of the discharge port the glass protruding from said port to form gathers, mechanical means adapted to be inserted into said port between shearing operations to temporarily interrupt the flow of glass, and adjustable means for regulating the relative operations of said mechanism and said means for the purposes described.

14. In a glass feeder, for use in connection with a container for molten glass provided with a discharge port, the combination of shearing mechanism intermittently operated to sever at the mouth of the discharge port the glass protruding from said port to form gathers, a pushback adapted to be inserted into said port after each shearing operation to temporarily interrupt the flow of glass, and adjustable means for regulating the relative operations of said mechanism and said pushback for the purposes described.

15. In a glass feeder, for use in connection with a container for molten glass provided with a discharge port, the combination of shearing mechanism intermittently operated to sever at the mouth of the discharge port the glass protruding from said port to form gathers, mechanical means adapted to be inserted into said port between shearing operations to temporarily interrupt the outward flow of glass, and means coacting with the inner end of said port to regulate the movement of glass therein.

16. In a glass feeder, for use in connection with a container for molten glass provided with a discharge port, the combination of shearing mechanism intermittently operated to sever the glass protruding from said port to form gathers, a pushback adapted to be inserted into said port after each shearing operation to force back the sheared neck and temporarily interrupt the outward flow of glass, and means coacting with the inner end of said port to regulate the movement of glass therein.

17. In a glass feeder, for use in connection with a container for molten glass provided with a discharge port, the combination of shearing mechanism intermittently operated to sever at the mouth of the discharge port the glass protruding from said port to form gathers, mechanical means adapted to be inserted into said port between shearing operations to temporarily interrupt the flow of glass, and plunger means reciprocable in relation to the inner end of said port to regulate the movement of glass.

18. In a glass feeder, for use in connection with a container for molten glass provided with a discharge port, the combination of shearing mechanism intermittently operated to sever the glass protruding from said port to form gathers, a pushback adapted to be inserted into said port after each shearing operation to force back the sheared neck and temporarily interrupt the outward flow of glass, and plunger means reciprocable in relation to the inner end of said port to regulate the movement of glass therein.

19. In a glass feeder, for use in connection with a container for molten glass provided with a discharge port, the combination of reciprocating mechanical means for discharging glass at intervals through said discharge port, and for attenuating the neck of the protruding glass to facilitate severance, means for severing the neck to form gathers, and a pushback to be inserted into the outer end of said port for forcing the severed neck back into said port to temporarily interrupt the flow of glass.

20. In a glass feeder, for use in connection with a container for molten glass provided with a discharge port, the combination of reciprocating mechanical means for discharging glass at intervals through said discharge port, for attenuating the neck of the protruding glass to facilitate severance and for sucking back the severed neck into said port, means for severing the neck to form gathers, and a pushback to be inserted into the outer end of said port for forcing the severed neck back along the same to temporarily interrupt the flow of glass.

21. In a glass feeder, for use in connection with a container for molten glass provided with a discharge port, the combination of shearing mechanism intermittently operated to sever at the mouth of the discharge port the glass protruding from said port to form gathers, a pushback adapted to be inserted into said port, and means for inserting said pushback up into said port after each shearing operation.

22. In a glass feeder, for use in connection with a container for molten glass provided with a discharge port, the combination of shearing mechanism intermittently operated to sever at the mouth of the discharge port the glass protruding from said port to form gathers, a pushback adapted to be inserted into said port after each shearing operation to effect the temporary interruption of the flow of glass, and means for inserting said pushback into said port and removing the same from said port between intermittent shearing operations.

23. In a glass feeder, for use in connection with a container for molten glass provided with a discharge port, the combination of shearing mechanism intermittently operated to sever at the mouth of the discharge port the glass protruding from said port to form gathers, a pushback adapted to be inserted into said port after each shearing operation to effect the temporary interruption of the flow of glass, and means for positioning said pushback under said port and inserting it up into the same and then removing said pushback from said port and moving it out of the way of the gathers.

24. In a glass feeder, for use in connection with a container for molten glass provided with a discharge port, the combination of intermittently operated means for shearing the glass protruding from said port to form gathers, a pushback adapted to be inserted into said port between shearing operations to temporarily interrupt the flow of glass, and means whereby the degree of insertion of said pushback is automatically regulated to suit the varying viscosities of the glass.

25. In a glass feeder, for use in connection with a container for molten glass provided with a discharge port, the combination of intermittently operated means for shearing the protruding glass to form gathers, a pushback adapted to be inserted into said port between shearing operations to temporarily interrupt the flow of glass, and means whereby the degree of insertion of said pushback is regulated by the viscosity of the glass, the gathers being therefore automatically kept uniform.

26. In a glass feeder, for use in connection with a container for molten glass provided with a discharge port, the combination of means intermittently operated to sever the glass protruding from said port to form gathers, a pushback adapted to be inserted in said port after each severing operation to force back the sheared neck in said port and temporarily interrupt the flow of glass, and means for regulating the dwell of said push back in said port.

27. In a glass feeder for use in connection with a container for molten glass provided with a discharge port, the combination of means intermittently operated to sever the glass protruding from said port to form gathers; a push back adapted to be inserted in said port to force back the sheared neck of glass in said port and temporarily interrupt the flow of glass, and means for regulating the degree of insertion of said push back in said port.

28. In a glass feeder, for use in connection with a container for molten glass provided with a discharge port, the combination of means intermittently operated to sever the glass protruding from said port to form gathers, a push back adapted to be inserted in said port after each severing operation to force back the sheared neck of glass in said port and temporarily interrupt the flow of glass, and means for regulating the speed of insertion of said push back into said port.

29. In a glass feeder, for use in connection with a container for molten glass provided with a discharge port, the combination of means intermittently operated to sever the glass protruding from said port to form gathers, a push back adapted to be inserted in said port after each severing operation to force back the sheared neck of glass in said port and temporarily interrupt the flow of glass, and means for maintaining said push back at proper temperature.

30. In a glass feeder for use in connection with a container for molten glass provided with a discharge port, the combination of mechanism intermittently operated to sever the glass protruding from said port to form gathers, a push back adapted to be inserted in said port after each shearing operation to force back the sheared neck of glass in said port and temporarily interrupt the outward flow of glass, and means for preventing interference between said severing mechanism and said push back.

Signed at Pittsburgh, Pa., this 2nd day of December, 1920.

WILLIAM J. MILLER.